United States Patent
Kanani et al.

(10) Patent No.: US 11,921,736 B2
(45) Date of Patent: Mar. 5, 2024

(54) SYSTEM FOR UNSUPERVISED DIRECT QUERY AUTO CLUSTERING FOR LOCATION AND NETWORK QUALITY

(71) Applicant: Microsoft Technology Licensing, LLC, Redmond, WA (US)

(72) Inventors: Pritesh Kanani, Seattle, WA (US); Siunie Sutjahjo, Seattle, WA (US); James Feore, Seattle, WA (US); Wei Zhong, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 410 days.

(21) Appl. No.: 17/126,006

(22) Filed: Dec. 17, 2020

(65) Prior Publication Data
US 2022/0197899 A1    Jun. 23, 2022

(51) Int. Cl.
*G06F 16/248* (2019.01)
*G06F 16/28* (2019.01)
*G06N 20/00* (2019.01)

(52) U.S. Cl.
CPC .......... *G06F 16/248* (2019.01); *G06F 16/285* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 2015/0026167 A1* | 1/2015 | Neels | G06F 3/0482 707/723 |
| 2017/0316052 A1* | 11/2017 | Marin | G06F 16/2452 |
| 2018/0276417 A1* | 9/2018 | Cerezo Sanchez | H04L 9/008 |
| 2019/0286636 A1* | 9/2019 | Bedard | G06F 16/248 |
| 2020/0004794 A1* | 1/2020 | Pal | G06F 16/951 |
| 2020/0175971 A1* | 6/2020 | Arora | H04B 7/18519 |

* cited by examiner

*Primary Examiner* — Yu Zhao
(74) *Attorney, Agent, or Firm* — NovoTechIP International PLLC

(57) ABSTRACT

Techniques performed by a data processing system for diagnosing problems with a communications platform include obtaining query parameters including an aggregation operator for invoking a machine learning algorithm configured to analyze performance data for the communications platform, automatically executing the query on the performance data to obtain query results by invoking the machine learning algorithm on the performance data to automatically identify a plurality of clusters of data indicative of a performance problem, and presenting a visualization of the query results. The visualization includes indicators identifying cluster properties for which the query results are further refinable and one or more second indicators identifying the second subset of the second cluster properties which are not relevant for further refining the first query results. The indicators are actuatable to automatically update and re-execute the first query based on the respective indicator that is actuated.

20 Claims, 11 Drawing Sheets

| Region | Country | City | Good Count | Poor Count | Poor Con. | Poor Score |
|---|---|---|---|---|---|---|
| EMEA | CHA | Zurich | 2,578 | 8 | 0.05 | 0.02 |
| EMEA | BE | Zavent. | 19,621 | 181 | 1.18 | 1.08 |
| EMEA | EG | Cairo | 7,169 | 55 | 0.36 | 0.27 |
| EMEA | HR | Zagreb | 850 | 10 | 0.07 | 0.08 |
| ASIA | CN | Xian | 5,588 | 175 | 1.14 | 3.47 |
| ASIA | CN | Wuxi | 157,824 | 647 | 4.22 | 1.72 |
| CAN | CA | Winne. | 253 | 4 | 0.03 | 0.04 |
| MSUS | US | Toledo | 5,216 | 10 | 0.07 | 0.01 |

Filters

Search:

Filters on this Page:
Add data fields here

Filters on all Pages:
Add data fields here

Visualizations

Values:
Add data fields here

Fields

Search:

Query 1:
- ☐ Date
- ☐ Σ AudioGood
- ☐ Σ AudioPoor
- ☐ AudioPoor
- ☐ Autocluster
- ☐ Diffpattern
- ☐ SecondBuilding

FIG. 4A

420 Fields

Search:

Query 1:
- ☐ Date
- ☐ Σ AudioGood
- ☐ Σ AudioPoor
- ☐ AudioPoor
- ☒ Autocluster
- ☐ Diffpattern
- ☐ SecondBuilding

415 Visualizations

Values: Add data fields here

410 Filters

Search:

Filters on this Page: Add Autocluster fields here

Filters on all Pages: Add data fields here

425 We have tried mapping all of your locations to see which once contribute mode to your poor call experience. Wild card members (*) indicate that poor call experience is similar for most of the items in this dimension. Hence, further drill down is NOT recommended for root cause analysis for wildcard members.

| Region | Country | City | Building | Network | Subnet | Percent |
|---|---|---|---|---|---|---|
| ASIA | * | * | * | * | * | 6.34 |
| EMEA | * | * | * | * | * | 6.38 |
| ASIA | IN | * | * | * | * | 4.17 |
| Puget Sound | US | Redmond | * | * | * | 57.80 |

FIG. 4B

Fields

Search:

Query 1:
- ☐ Date
- ☐ Σ AudioGood
- ☐ Σ AudioPoor
- ☐ AudioPoor
- ☐ Autocluster
- ☐ Diffpattern
- ☐ SecondBuilding

Visualizations

Values: Add data fields here

Filters

Search:

Filters on this Page: Add data fields here

Filters on all Pages: Add data fields here

| Region | Country | City | Building | Good Count | Poor Count | Poor Con. |
|---|---|---|---|---|---|---|
| ASIA | IN | Bangalore | BAN-Campus1 | 1,278 | 1118 | 2.05 |
| ASIA | IN | Chennai | CHN-Building11 | 101 | 4 | 1.02 |
| ASIA | IN | Hyderabad | HYD-CampusA | 181 | 11 | 0.02 |
| ASIA | IN | Hyderabad | HYD-CampusB | 470 | 22 | 0.08 |
| ASIA | IN | Bangalore | BAN-Campus3 | 1119 | 301 | 2.28 |
| ASIA | IN | Kolkata | KKTA-Main | 1811 | 110 | 0.05 |

FIG. 4C

SYSTEM FOR UNSUPERVISED DIRECT QUERY AUTO CLUSTERING FOR LOCATION AND NETWORK QUALITY

BACKGROUND

Online communications platforms for videoconferencing, messaging, collaboration, and file sharing have become increasingly important as more and more people work remotely in response to the current global pandemic. Many companies, school, universities, and other organizations may use the online communication platforms to conduct business, teach classes, and/or to conduct other critical functions of the organization. Network administrators may monitor the performance of the online communications platform to ensure that critical functionalities, such as calling and videoconferencing, are operating correctly and attempt to diagnose network problems that may be contributing to degradation of these services.

The communications platform may be distributed across a wide geographic area and include numerous components that may contribute to a network problem that negatively impacts the user experience. Network administrators may query system log information for the communications platform in an attempt to diagnose the problem. However, the system logs typically involve an extremely large amount of data to be analyzed. These logs may include multiple terabytes of data for large organizations. Analyzing the log data is generally a manual process in which the administrator may manually formulate a series of queries to analyze the data to identify a root cause or causes of the performance problems is an extremely time consuming and difficult task. Hence, there is a need for improved systems and methods of analyzing system log information and for identifying problems in the network that negatively impact user experience.

SUMMARY

An example data processing system according to the disclosure may include a processor and a computer-readable medium storing executable instructions. The instructions, when executed, cause the processor to perform operations including presenting, on a display of the data processing system, a user interface of a data analysis platform for constructing queries for requesting performance data associated with a communications platform and for creating visualizations of the performance data for diagnosing a first performance problem of the communications platform; receiving, via the user interface, a first user input defining first query parameters for a first query via the user interface, the first query parameters including a first aggregation operator for invoking a first machine learning algorithm configured to analyze the performance data to identify clusters of data indicative of a cause of a first performance problem of the communications platform; automatically executing the first query on the performance data using the first query parameters to generate first query results by invoking the first machine learning algorithm on the performance data to automatically identify a plurality of first clusters of data indicative of the first performance problem; automatically identifying a set of first cluster properties associated with each cluster of the plurality of first clusters of data; automatically identifying a first subset of the first cluster properties for which the first query results are further refinable to identify contributing factors to the first performance problem and a second subset of the first cluster properties which are not relevant for further refining the first query results; presenting, via the user interface, a first visualization of the first query results, wherein the first visualization includes information for diagnosing the first performance problem, wherein the first visualization includes one or more first indicators identifying the first subset of the first cluster properties for which the first query results are further refinable and one or more second indicators identifying the second subset of the second cluster properties which are not relevant for further refining the first query results, and wherein the one or more first indicators are actuatable to cause the processor to automatically update and re-execute the first query based on a respective indicator of the one or more indicators that is actuated; automatically updating the first query parameters to include a respective first cluster property associated with the respective indicator responsive to the second user input; automatically executing the second query on the performance data using the second query parameters to generate second query results by invoking the first machine learning algorithm on the performance data to automatically identify a plurality of second clusters of data indicative of the first performance problem; and presenting, via the user interface, a second visualization of the second query results.

An example method implemented in a data processing system for diagnosing problems in a communications platform includes presenting, on a display of the data processing system, a user interface of a data analysis platform for constructing queries for requesting performance data associated with a communications platform and for creating visualizations of the performance data for diagnosing a first performance problem of the communications platform; receiving, via the user interface, a first user input defining first query parameters for a first query via the user interface, the first query parameters including a first aggregation operator for invoking a first machine learning algorithm configured to analyze the performance data to identify clusters of data indicative of a cause of a first performance problem of the communications platform; automatically executing the first query on the performance data using the first query parameters to generate first query results by invoking the first machine learning algorithm on the performance data to automatically identify a plurality of first clusters of data indicative of the first performance problem; automatically identifying a set of first cluster properties associated with each cluster of the plurality of first clusters of data; automatically identifying a first subset of the first cluster properties for which the first query results are further refinable to identify contributing factors to the first performance problem and a second subset of the first cluster properties which are not relevant for further refining the first query results; presenting, via the user interface, a first visualization of the first query results, wherein the first visualization includes information for diagnosing the first performance problem, wherein the first visualization includes one or more first indicators identifying the first subset of the first cluster properties for which the first query results are further refinable and one or more second indicators identifying the second subset of the second cluster properties which are not relevant for further refining the first query results, and wherein the one or more first indicators are actuatable to cause the processor to automatically update and re-execute the first query based on a respective indicator of the one or more indicators that is actuated; receiving, via the user interface, a second user input actuating a respective indicator of the one or more first indicators; automatically updating the first query parameters to include a respective first cluster property associated with the respective indicator responsive to the second user input; automatically executing the second query on the performance data using the second query parameters to generate second query results by invoking the first machine learning algorithm on the performance data to automatically identify a plurality of second clusters of data indicative of the first performance problem; and presenting, via the user interface, a second visualization of the second query results.

An example computer-readable storage medium on which are stored instructions. The instructions when executed cause a processor of a programmable device to perform functions of presenting, on a display of the data processing system, a user interface of a data analysis platform for constructing queries for requesting performance data associated with a communications platform and for creating visualizations of the performance data for diagnosing a first performance problem of the communications platform; receiving, via the user interface, a first user input defining first query parameters for a first query via the user interface, the first query parameters including a first aggregation operator for invoking a first machine learning algorithm configured to analyze the performance data to identify clusters of data indicative of a cause of a first performance problem of the communications platform; automatically executing the first query on the performance data using the first query parameters to generate first query results by invoking the first machine learning algorithm on the performance data to automatically identify a plurality of first clusters of data indicative of the first performance problem; automatically identifying a set of first cluster properties associated with each cluster of the plurality of first clusters of data; automatically identifying a first subset of the first cluster properties for which the first query results are further refinable to identify contributing factors to the first performance problem and a second subset of the first cluster properties which are not relevant for further refining the first query results; presenting, via the user interface, a first visualization of the first query results, wherein the first visualization includes information for diagnosing the first performance problem, wherein the first visualization includes one or more first indicators identifying the first subset of the first cluster properties for which the first query results are further refinable and one or more second indicators identifying the second subset of the second cluster properties which are not relevant for further refining the first query results, and wherein the one or more first indicators are actuatable to cause the processor to automatically update and re-execute the first query based on a respective indicator of the one or more indicators that is actuated; receiving, via the user interface, a second user input actuating a respective indicator of the one or more first indicators; automatically updating the first query parameters to include a respective first cluster property associated with the respective indicator responsive to the second user input; automatically executing the second query on the performance data using the second query parameters to generate second query results by invoking the first machine learning algorithm on the performance data to automatically identify a plurality of second clusters of data indicative of the first performance problem; and presenting, via the user interface, a second visualization of the second query results.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 4A, 4B, and 4C show examples of a user interface that may be used for building queries and data visualizations.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for diagnosing network issues in a communications platform are provided. These techniques solve the technical problem of identifying network problems in the large volumes of performance data captured by the communications platform. These techniques provide a technical solution to this problem that utilizes machine learning (ML) algorithms to identifying clusters of data that may be indicative of network problems in the performance data captured for the communications platform. A query building and data visualization user interface is provided that allows the user to quickly build and execute queries on the performance data that include ML aggregation operators. The ML aggregation operators operate to identify clusters of data that may be indicative of network problems impacting the performance of the communications platform and capture that data for presentation in the query building and visualization interface. The query building and data visualization user interface provides another technical benefit by automatically identifying query parameters associated with clusters of data that may be used to further refine the query results to narrow down the cause of the network performance problems. Automatically identifying which query parameters may be used to further refine the query results can save a network administrator significant amounts of time and effort. The administrator may select one or more query parameters that have been automatically identified by the query building and data visualization user interface to drill down further into the query results. These and other technical benefits of the techniques disclosed herein will be evident from the discussion of the example implementations that follow.

Figure 1:
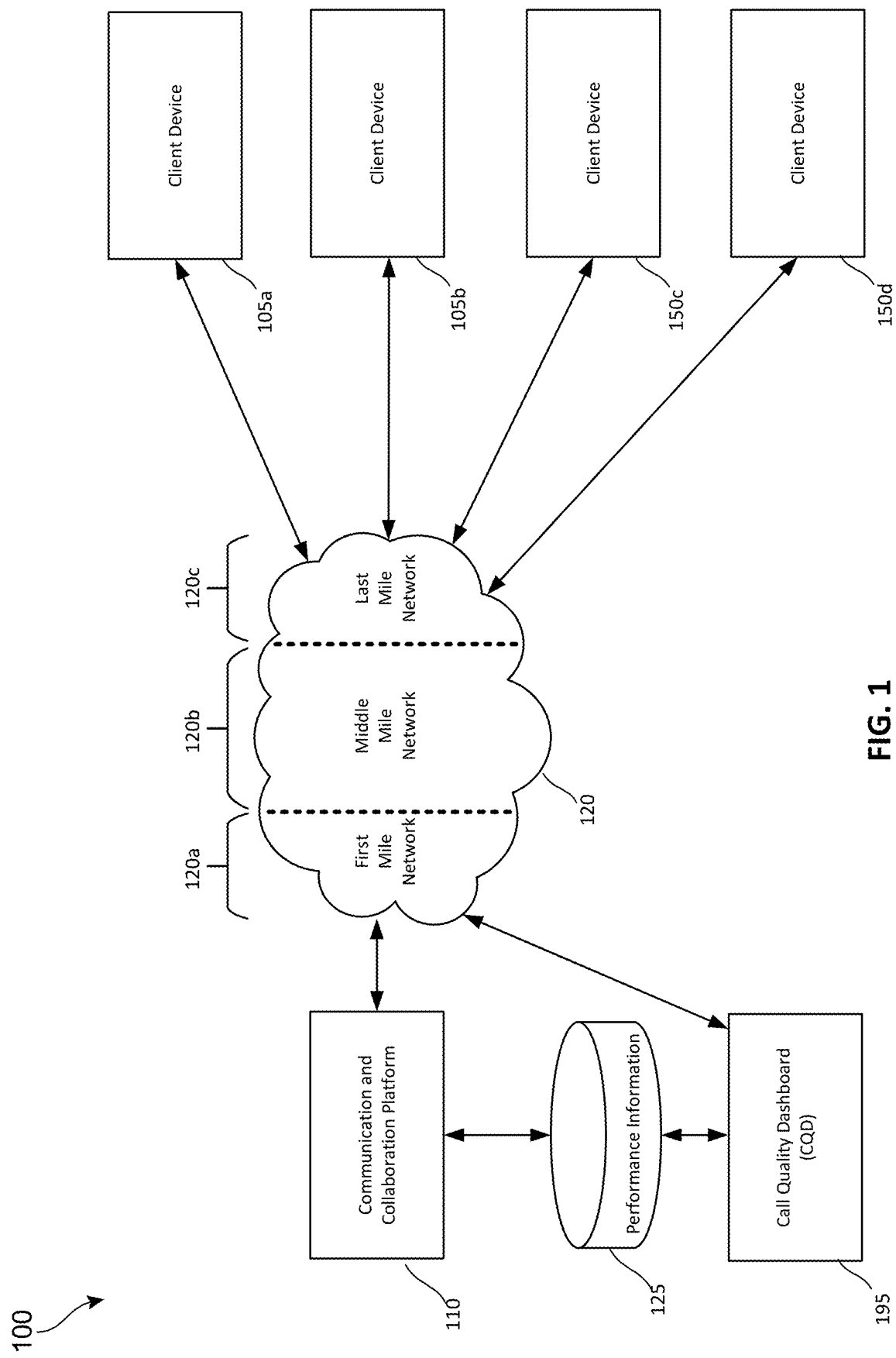
FIG. 1 is a diagram showing an example computing environment in which the techniques disclosed herein may be implemented.

FIG. 1 is a diagram showing an example computing environment 100 in which the techniques disclosed herein diagnosing network problems impacting performance of a communications platform may be implemented. The computing environment 100 may include a communication and collaboration platform 110, performance datastore 125, and a call quality dashboard (CQD) 195, a network 120, and client device 105a-105d.

The communication and collaboration platform 110 provides tools for videoconferencing, messaging, collaboration, file sharing, online presentations, and/or other collaborative and communication activities. The communication and collaboration platform 110 may be implemented as a cloud-based service or set of services that may be accessed by the computing devices, such as the computing devices 105a-105d, of participants to a communication and/or collaborative work session. The communication and collaboration platform 110 may be configured to provide web-based applications to permit participants to access the services provided by the communication and collaboration platform 110 via a web-browser or browser-enable native application installed on the client device of the participants. The communication and collaboration platform 110 may also be configured to expose an application programming interface (API) that allows native applications installed on the communication and collaboration platform 110 one or more of the client devices to access services on the communication and collaboration platform 110. The one or more client devices may include a native application for communication and/or collaboration that may use one or more of the services provided by the communication and collaboration platform, such as but not limited videoconferencing, audioconferencing, messaging, file sharing and/or collaborative editing, and/or such services. In some implementations, the communications platform 110 may be implemented by Microsoft Teams, Microsoft Skype for Business, or other such communication and collaboration platform 110.

The communication and collaboration platform 110 may communicate with the client devices 105a-105d via the network 120. The network 120 may include one or more public and/or private networks and may be implemented, at last in part, by the Internet. In the example shown in FIG. 1, the network has been subdivided into three separate functional components: the first mile network 120a, the middle mile network 120b, and the last mile network 120c. The first mile network 120a, middle mile network 120b, and last mile network 120c use the term "mile" metaphorically to describe portions of the network 120 that perform specific functions. The first mile network 120a provides connectivity from the client premises to the outside world. The middle mile network 120b may include third party services, Internet service providers, and other elements which provide connectivity between the first mile network 120a and the last mile network 120c. The last mile network 120c may include one or more private networks associated with an enterprise or organization. The last mile network 120c may include various devices, including but not limited to the client devices 105a-105d. The communication and collaboration platform 110 may obtain telemetry data (also referred to herein as "performance data" or "calling and meeting telemetry data") from various elements of the first mile network 120a, the middle mile network 120b, and the last mile network 120c and store the telemetry data in the performance information datastore 125.

The performance information datastore 125 may be one or more persistent data storage elements configured to receive and store the telemetry data from one or more network elements of the first mile network 120a, the middle mile network 120b, and the last mile network 120c. The telemetry data may provide information indicative of the performance of various network elements. The communication and collaboration platform 110 may include data in one or more log files, one or more databases or other data store, and/or other persistent storage database system. The communication and collaboration platform 110 may support many different organizations (also referred to herein as "tenants") and the performance data associated with the network elements for each of these tenants may be stored in the performance information datastore 125. The data stores may be searchable stored in a format that is searchable by the CQD 195 as will be discussed in greater detail in the examples which follow.

The CQD 195 may be configured to provide tools that allow network administrators to access the performance data stored in the performance information datastore 125 associated with their respective organization. The CQD 195 may provide a query building user interface and a data visualization user interface. The query building user interface may be configured to allow administrators to quickly and efficiently formulate queries on the performance data stored in the performance information datastore 125 and to generate visualizations of the data. The visualizations may include tables, reports, graphs, and/or other visualizations of the performance data. The query builder user interface may provide a drag-and-drop interface where the network administrator or other authorized users may drag in or otherwise add in query parameters from a set of predefined query parameters. The query builder user interface may also be configured to allow the user to drag in operators that may perform certain predetermined actions on the query data. These operators may include aggregation operators that indicate that data from certain columns should be summed or otherwise aggregated. These operators may also include one or more ML aggregation operators (also referred to herein as "ML aggregation operators") that may be selected analyze performance data using one or more machine learning algorithms to identify clusters of data that may be relevant for diagnosing network problems that negatively impact the performance of various functions of the communication and collaboration platform 110. Network problems that impact the performance of these functions may negatively impact the user experience of the participants to a communication and/or collaboration session hosted by the communication and collaboration platform 110.

The query builder user interface provides a technical solution to the problem of integrating ML-based queries into the investigations being performed by an administrator attempting to diagnose network problems that are impacting performance. The ML aggregation operators provided by the query builder user interface of the CQD 195 allow an administrator to seamlessly introduce ML driven analysis into the queries formulated using the query builder user interface. The queries are then analyzed by the CQD 195 and the query and any ML driven elements are executed on data from the performance information datastore 125. Currently, no tools provide means for seamless integration of ML aggregation operators into such a query builder user interface. Instead, an administrator constructs a standard query of the performance data of the performance information datastore 125 and separately invokes the ML analysis elements on the performance data of the performance information datastore 125. The standard query may use Standard Query Language (SQL) for querying relational databases or other query languages for querying the performance data of the performance information datastore 125. The particular language or languages used to formulate the query may depend upon the implementation of the performance information datastore 125 and/or the language or languages supported by the query builder interface of the CQD 195. The ML-driven analysis may require the administrator to prepare a dataset from the performance data in a format that may be analyzed by the ML algorithms to be applied. The results from the standard query and the ML analysis have to be combined into a single set of results or the two sets of results may be separately analyzed by the administrator to try to understand what the source of the network problems that is degrading the performance of the communication and collaboration platform 110. The query builder user interface provided by the CQD 195 overcomes this significant technical problem with current approaches to using ML operators on the performance data by treating the ML operators as any other aggregation operator that may be included in the query being constructed. The administrator does not need to take any special actions to invoke the ML driven analysis of the performance data or to integrate the results of such an aggregator into the query results. Examples on how these aggregators may be utilized and how their use can significantly decrease the amount of time required to identify sources of network problems will be shown in the examples which follow.

The client devices 105a-105d shown in FIG. 1 may be implemented as a portable electronic device, such as a mobile phone, a tablet computer, a laptop computer, a portable digital assistant device, a portable game console, and/or other such devices. The client devices 105a-105d may also be implemented in computing devices having other form factors, such as a vehicle onboard computing system, a video game console, a desktop computer, and/or other types of computing devices. Each of the client devices 105a-105d may have different capabilities based on the hardware and/or software configuration of the respective client device. While the example implementation illustrated in FIG. 1 includes four client devices, other implementations may include a different number of client devices. The client devices 105a-105d may be used by participants to access an online communication session and/or collaboration session hosted by the communication and collaboration platform 110. The client devices 105a-105d may also be used by administrators to gain access to access the CQD 195 to query performance data associated with the respective network elements associated with the organization of the administrator to try to diagnose problems with the network that are impacting the user experience of users associated with their organization.

Figure 2:
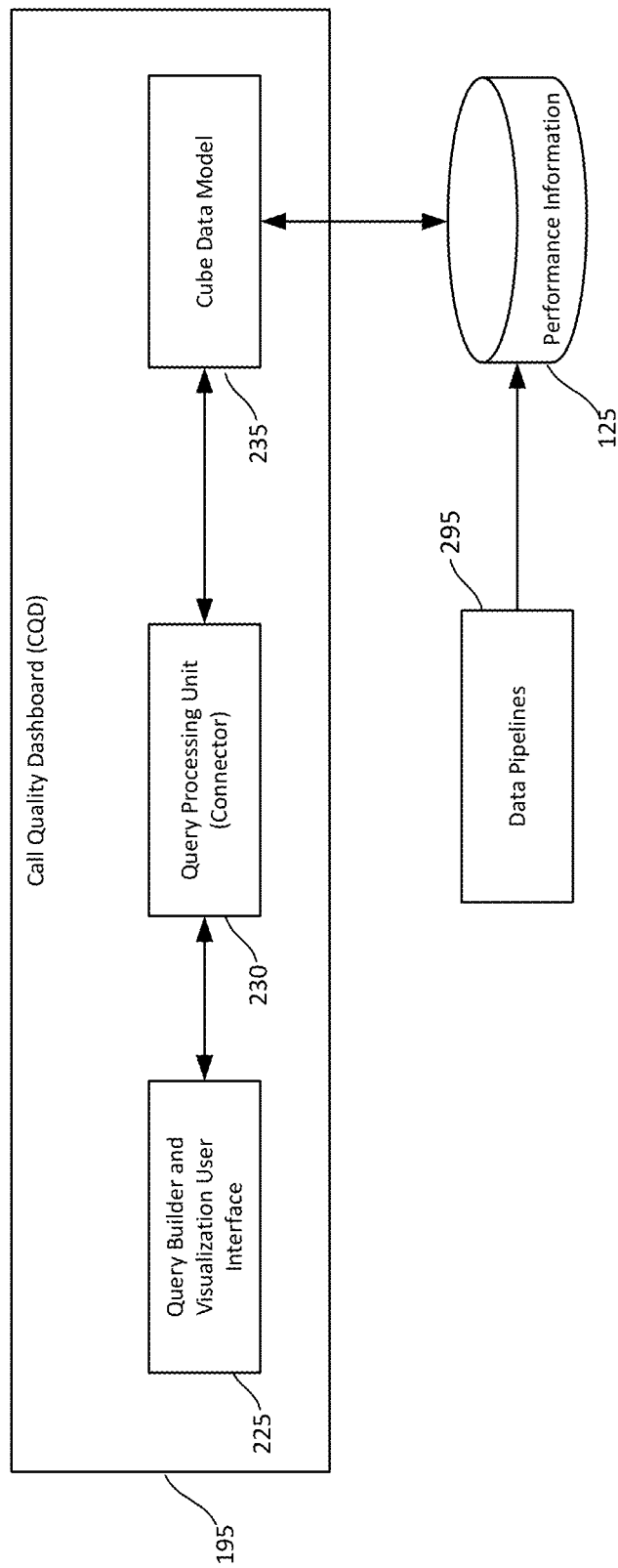
FIG. 2 is an example of a call quality dashboard that may be used to implement the call quality dashboard shown in FIG. 1.

FIG. 2 is a diagram showing additional details of the CQD 195. The CQD 195 may include a query builder and visualization user interface 225, a query processing unit 230 (also referred to herein as a "connector"), and a cube data model 235. The data cube model may query data from the performance information datastore 125. Furthermore, one or more data pipelines 295 may be configured to receive telemetry data from various components of the network 120 supporting the communication and collaboration platform 110.

The query builder and visualization user interface 225 provides a user interface for building queries and for displaying visualization of query results. In some implementations, the query builder and visualization user interface 225 may be implemented using Microsoft Power BI. Microsoft Power BI is a business analytics service that provides interactive visualizations and business intelligence capabilities and a user interface that allows users to create customized reports and dashboards. Other implementations may utilize other visualization and analytics tools or services.

The query builder and visualization user interface 225 may provide a drag-and-drop interface in which query parameters may be dragged into a query building interface to build queries for analyzing data in a data source, such as the performance information datastore 125. One of the types of tools provided by the query builder and visualization user interface 225 is aggregation operators. Aggregation operators are used to combine information from a set of information, such as a column of data, to provide an aggregated value for that set of information. Commonly used aggregation operators include, but are not limited to, sum, count, average, minimum, and maximum. The aggregations operators may be dragged and dropped into a query builder interface of the query builder and visualization user interface 225 to add the aggregation operators to the query.

The query builder and visualization user interface 225 provides support for ML aggregation operators. The ML aggregation operators may be used to invoke machine learning algorithms on the data in the data source, such as the performance information datastore 125. Machine learning algorithms have been used to analyze data for reporting and visualization, but typically involve a manual process to invoke the machine learning algorithm on the data source and to incorporate the results of the analysis into results obtained using standard queries. The data may need to be preprocessed to a particular format in order for the machine learning algorithm to be able to utilize the data and the output of the machine learning algorithm may also need to be reformatted to a particular format for the data to be usable by the reporting and visualization tools. As a result, the utilizing machine learning algorithms to analyze the data often became a complicated multi-step process. The query builder and visualization user interface 225 provides a technical solution to this technical problem by treating ML aggregation operators as any other aggregation operator. The user may drag and drop the ML aggregation operators into a query in the same way as any of the commonly used non-ML aggregation operators. The query processing unit 230, described below, is configured to translate the query parameters assembled by the user in the query builder and visualization user interface 225 into an executable query. The query processing unit 230 is configured to recognize that a ML aggregation operator has been included in a query and to automatically handle any processing required to invoke the machine learning algorithm on the data and to integrate the results from the machine learning algorithm into the query results. This approach eliminates the complexity typically associated with utilizing machine learning algorithms in queries by allowing the user to drag and drop in ML aggregation operators into a query and the automatically invoking and processing the results as if the machine learning algorithm were any other query. This approach significantly improves the usability of the CQD 195.

The ML aggregation operators may be used to invoke a machine learning algorithm on the performance data of the communication and collaboration platform 110. The ML aggregation operators may be used to perform a much more complex analysis than would be possible with the standard aggregation operators, such as average or sum. The ML aggregation operators are configured to analyze the performance data to identify patterns within that data that may be indicative of the source of performance problems of the communication and collaboration platform 110. The query builder and visualization user interface 225 may provide an interface that allows the user to configure one or more parameters of the ML operators. The specific parameters that may be configured may depend on the ML operator being added to a query. The user interface may automatically be displayed by the query builder and visualization user interface 225 in response to the user adding a ML aggregation operator to a query. Alternatively, the user interface may display configuring the parameters of the ML aggregation operator in response to the user clicking on or otherwise actuating a representation of the ML aggregation operator in the query builder interface. In some implementations, the query builder and visualization user interface 225 may be configured to handle some aggregations, such as, but not limited to, sum, count, average, minimum, and maximum within the query builder and visualization user interface 225. However, the query builder and visualization user interface 225 may be configured to disable such calculations in response to the user including a ML aggregation operator in a query, and the query builder and visualization user interface 225 instead relies on the cube data model 235 to calculate all of the aggregations associated with the query.

One ML aggregation operator that may be provided by the query builder and visualization user interface 225 is an automatic clustering or "autocluster" aggregation operator. The autocluster aggregation operator is configured to cause the cube data model 235 to invoke an autocluster algorithm on the performance information stored in the performance information datastore 125. The autocluster algorithm is configured to perform a volumetric comparison of the values of various dimensions of the data to identify values or combinations of values which are overrepresented in the data. The autocluster aggregation operator may be useful in determining a root cause location as a possible source of call quality issues, video quality issues, and/or other performance problems experienced by the communication and collaboration platform 110. For example, the autocluster aggregation operator may be configured to filter for poor call quality and use location-based dimensions, such as but not limited to, city, country, or building, to determine which locations are statistically overrepresented in the data, indicating that a root cause of the performance problem may be associated with network elements at the locations which are statistically overrepresented in the data.

Another ML aggregation operator that may be provided by the query builder and visualization user interface 225 is an automatic differentiation or "diffpatterns" aggregation operator. The diffpatterns aggregation operator is configured to cause the cube data model 235 to invoke an autocluster algorithm on the performance information stored in the performance information datastore 125. The diffpatterns aggregation operator may be used to compare two sets of data and to identify differences between those two sets of patterns. The diffpatterns aggregation operator may be used to identify differences in key metrics in the performance data for two days. The first day is a day on which the communication and collaboration platform 110 was not experiencing a particular performance problem and a second day on which the communication and collaboration platform 110 was experiencing the performance problem. The diffpatterns aggregation operator compares the performance data for these two days to identify spikes or dips in key metrics on the day on which the performance problems were experienced. Performing such a comparison in the past was typically a tedious and manually intensive task in which the user would have to normalize the volumes of data associated with the first and second day and then manually run queries in an attempt to identify the relevant metrics. The diffpatterns aggregation operator automates this process by automatically normalizing the two volumes of data and automatically performing the comparisons to identify the differences in key metrics between the two days. The diffpatterns aggregation operator automatically identifies metrics that most contribute to differences between the two days. An administrator may use this information to diagnose network problems that are impacting the performance of the communication and collaboration platform 110.

The query processing unit 230 serves as a connector between the query builder and visualization user interface 225 and data sources, such as the cube data model 235. The query processing unit 230 may be configured to receive the query built using the query builder tools of the query builder and visualization user interface 225 and translate that query to a second query format that may be utilized by the cube data model 235. In some implementations, the first query format may be Power M query language and the second query format may be SQL query or other query format suitable for querying the cube data model 235. The query processing unit 230 may also be configured to receive query results from the cube data model 235 and to format the results into a format that may be processed by the query builder and visualization user interface 225 to create a visualization of the data.

The cube data model 235 may serve as an interface that allows the query builder and visualization user interface 225 to query and analyze data of the performance information datastore 125 as if the performance data were stored in an online analytical processing (OLAP) data cube. A data cube is a multidimensional array of data that may have an arbitrary number of dimensions and facilitates data analysis and reporting. The dimensions are logical groupings of data based on certain attributes, such as but not limited to, date, location, or other logical attributes that may be used to group data elements. The data cube may be "sliced" and "diced" to generate reports and visualizations of the data included in the cube. A slice of the data may be obtained by setting the value of a particular attribute to obtain data associated with the that attribute value. For example, the date attribute may be set to a particular date to obtain a slice of data associated with that date or the location attribute may be set to a particular location to obtain data associated with that particular location. A dice operation may also be performed on the data cube by setting attribute values for multiple dimensions. For example, both the date and the location attributes may be set. Furthermore, the data cube may allow the user to "drill down" or "drill up" among levels of data in the data cube. For example, the location attribute may include multiple layers, such as but not limited to, continent, country, state or province, city, street, or building. The query builder and visualization user interface 225 may provide interface elements that allow the user to drill up or drill down through these layers of data.

The cube data model 235 presents the performance data from the performance information datastore 125 as if the data were a data cube. However, the underlying data stored in the performance information datastore 125 may be stored one or more data stores which are not designed for analysis via a cube data model. For example, the performance information datastore 125 may include columnar data that may be queried. For example, at least a portion of the performance data may be stored as a columnar database with precalculated aggregation or other features that are typically provided by the cube data model. In some implementations, the performance information datastore 125 may be built on Microsoft Azure Data Explorer, which is a service for storing and running interactive analytics on large amounts of data. Kusto Query Language may be used to query such data stores built using Microsoft Azure Data Explorer. In other implementations, the performance information datastore 125 may be implemented using other types of data store which may use other query languages to query the data store. Kusto does not provide for precalculated aggregations and other such features that may be provided by some database management system. However, the cube data model 235 may be configured to handle all aggregations, whether or not they are ML-driven, within the cube data model 235.

The cube data model 235 provides an interface between the performance information datastore 125 and the query processing unit 230 that presents the data in the performance information datastore 125 as if the data were a cube and also presents a unified data store to the query. The underlying performance information datastore 125 may include multiple data sources. The cube data model 235 is configured to execute the query received from the query processing unit 230, including invoking any ML-aggregation operators included in the query. The cube data model 235 may obtain query results from by querying the performance information datastore 125 and by executing one or more ML algorithms on data included in the performance information datastore 125. The cube data model 235 is configured to combine the results obtained from the query and the ML algorithms into combined query results that may be accessed by the query processing unit 230. The query processing unit 230 may be configured to convert the query results to a format that may be presented as one or more reports, graphics, and/or other visualizations by the query builder and visualization user interface 225.

The data pipelines 295 are configured to collect telemetry data from various elements of the network 120 and to add the telemetry data to the performance information datastore 125. The data pipeline 295 may capture the telemetry data and reformat the data to a format used to store the telemetry data in the performance information datastore 125. For example, as discussed in the preceding example, the performance information datastore 125 may be stored in a columnar format in a database implemented using Microsoft Azure Data Explorer. The telemetry data may be collected and added to the performance information datastore 125 in substantially real time, meaning that the telemetry data may be formatted and added to the performance information datastore 125 as it is received by the data pipelines 295. Because the data is added to the performance information datastore 125 in substantially real time, the reports, charts, and/or other visualizations of the performance data may be kept up to date and can provide near real time accuracy in the reports and visualizations provided by the query builder and visualization user interface 225.

Figure 3:
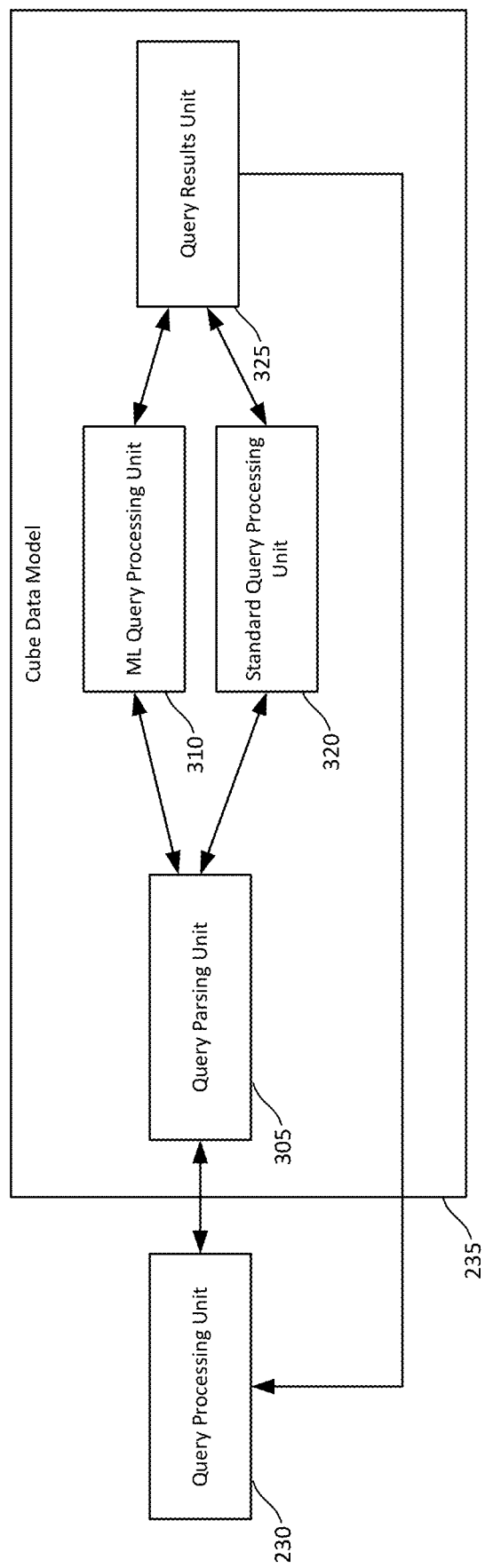
FIG. 3 is a diagram showing an example implementation of the cube data model 235.

FIG. 3 is a diagram showing an example implementation of the cube data model 235. The query processing unit 230 may provide the reformatted query that the query processing unit 230 generated from the original query generated by the query builder and visualization user interface 225. The reformatted query may be in a format suitable for querying a data cube and may be in SQL or another query language suitable for querying such data structures. FIG. 3 shows how the cube data model may automate the processing of machine learning and non-machine learning query elements and generate a set of results that combine the results from both the machine learning and non-machine learning query elements. A technical benefit of this approach is that the cube data model 235 presents a unified data model to the query builder and visualization user interface 225, which facilitates drill-down logic and other features that enable a user to quickly identify sources of performance problems on the communication and collaboration platform 110. Otherwise, if the query builder and visualization user interface 225 is presented with a data model which includes data from multiple sources, the drill-down logic and other such features become significantly more difficult to implement because the query builder and visualization user interface 225 does not know which data source provided which data.

The query parsing unit 305 may analyze the query received from the query processing unit 230 and determine whether the query includes ML aggregation operators, standard (non-ML) query language, or a combination thereof. The query parsing unit 305 may be configured to extract the ML aggregation operators and related query parameters from the query received from the query parsing unit 305 and to provide the extracted information to the ML query processing unit 310 for processing. The query parsing unit 305 may be configured to extract non-ML query language from the query received from the query parsing unit 305 and provide the non-ML query language to the standard query processing unit 320.

The standard query processing unit 320 may be configured to formulate a query that may be executed on the performance information datastore 125. The standard query processing unit 320 may be configured to execute a SQL query, Kusto query, or other type of supported query language. For example, where the performance information datastore 125 is implemented by Microsoft Azure Data Explorer, the query processing unit 320 may be configured to execute a Kusto query on performance information datastore 125. The query results obtained by the standard query processing unit 320 may be provided to the query results unit 325, which may combine these results with any ML-based query results and provided to the query processing unit 230.

The ML query processing unit 310 may be configured to execute one or more ML algorithms on the performance data of the performance information datastore 125. The query parsing unit 305 may extract one or more parameters for the ML query from the query received from the query processing unit 230 and provide those query parameters to the ML query processing unit. The ML query processing unit 310 may then invoke the ML algorithm associated with the ML aggregation operators that were included in the query. For example, if the user added the diffpatterns aggregation operator to the query in the query builder and visualization user interface 225, the ML query processing unit 310 may invoke the diffpatterns algorithm on the performance information datastore 125 and the ML query processing unit 310 may provide a set of dates and/or other parameters for the diffpatterns algorithm. The format of the results obtained from the ML algorithm depends on the particular algorithm that was executed on the data. The ML query processing unit 310 may be configured to provide the query results from the ML query to the query results unit 325.

The query results unit 325 may be configured to receive query results from the standard query processing unit 320, the ML query processing unit 310, or both. The query results unit 325 may be configured to format the query results into a format expected by the query processing unit 230. Furthermore, the query results unit 325 may be configured to combine the query results obtained from the standard query processing unit 320 and the ML query processing unit 310 where query results have been obtained from both standard and ML-based queries. The results are provided to the query processing unit 230, which may perform additional processing on the results before providing the results to the query builder and visualization user interface 225. The query builder and visualization user interface 225 may then generate reports, charts, tables, and/or other visualizations of the data.

FIGS. 4A, 4B, and 4C show examples of a user interface 405 that may be used for building queries and data visualizations. The user interface 405 may be implemented by the query builder and visualization user interface 225. The user interface 405 may include several panes that include tools for building the queries and/or customizing the visualizations. The user interface 405 may, in some implementations, be used to build a visualization that includes one or more charts, tables, graphs, and/or other representations of performance data included in the performance information datastore 125. The user interface 405 may, in some implementations, be used for creating a visualization that may be published so that other users may access the visualizations, which may be configured to automatically update based on the parameters set up by the creator of the visualization and the current performance data included in the performance information datastore 125.

FIG. 4A shows an example of the user interface 405 in which an administrator has accessed the user interface 405. The user interface 405 may be provided by a web-based application and accessed by a web-browser from a client device 105 of the administrator. The user interface 405 may also be provided by a native application installed on the client device 105 of the administrator, and the native application may be configured to access information from the CQD 195 and the performance information datastore 125. The user interface 405 may provide a means for connecting to the query processing unit 230 which serves as a connector to the cube data model 235. Once the connection has been established, to the cube data model 235.

The user interface includes a filters pane 410, a visualizations pane 415, and a fields pane 420. The visualizations pane 415 includes a set of visualizations that may be dragged and dropped into the query builder pane 425. The visualizations may include various types of charts, tables, reports, and other types of visualizations. The fields pane 420 includes a list of fields that are available in the cube data model 235. The fields pane 420 may be automatically populated with the field data in response to the connector establishing the connection with the cube data model 235. The fields from the fields pane 420 may include aggregation operators that may be applied to data from the cube data model 235. The aggregation operators may also include ML aggregation operators, such as but not limited to the autocluster aggregation and the diffpatterns aggregation operator shown in FIG. 4A. The fields and aggregation operators shown in the fields pane 420 may be dragged to a visualization the query builder pane 425. The filters pane 410 include filters that may be dragged into a visualization that has been placed in the query builder pane 425 to filter on a particular fiel420d. For example, the filter may be used to filter on a specific date or date range, a specific location, or other fields. In the example shown in FIG. 4A, a table has been added that is populated with some performance data for the communication and collaboration platform 110. The data shown in this example includes call quality data for various locations. The call quality data may be used in root cause analysis to determine locations that are experiencing poor call quality.

FIG. 4B shows an example of the user interface 405 in which the autocluster aggregation operator has been added to the builder pane 425. The user may drag the autocluster aggregation operator from the fields pane 420 to the builder pane 425. As shown in FIG. 4B, the user may add configuration parameters for the autocluster aggregation operator in the filters pane 410. The configuration parameters allow the user to set the parameters to be applied to the autocluster aggregation. The user interface 405 may also be configured to prompt the user to remove other non-relevant measurements in response to the autocluster aggregation operator being added to the builder pane 425. The user interface 405 may be configured to determine when the user adds a ML aggregation operator to the builder pane 425 and prompt the user to remove other aggregation measurements from the query. The ML query processing unit 310 may compute aggregations on the performance data where ML aggregation operators are invoked and the user interface 405 may prompt the user to remove other non-ML aggregation operators from the query.

FIG. 4B shows an example of the user interface 405 in which the autocluster aggregation operator has been dragged over to the table shown in the builder pane 425. The example shown in FIG. 4B shows an example report in which autocluster was added to the table of data shown in FIG. 4A to diagnose poor call quality issues. As can be seen in the example data shown in the query builder pane 425, the data shows wildcard values for some of the entries in the table. The wildcard indicator indicates a property, which if selected by the user to be added to the query, would not further refine the query results. The wildcard indicator indicates that the property associated with the indicator showed no significant statistical correlation to poor call quality in the performance information of the performance information datastore 125. For example, the region "EMEA" is shown in a table in the example 4B with wildcard indicators for each of the values. These wildcard indicators show that the autocluster algorithm found no statistical correlation between the poor call quality and any of these parameters for the region "EMEA" representing Europe, the Middle East, and Africa. Therefore, drilling down into the data for that region is not likely to provide useful information for diagnosing the poor call quality issues.

The non-wildcard values indicate that the user may further drill down into the data for this parameter to further refine the query results. For example, in the third row of the table shown in FIG. 4B, the country column indicates that drilling down into the data by adding the country "India" as a filter may provide additional details that may be indicative of the source of the poor call quality. The table shown in the query builder pane 425 may include hyperlinks or other controls that may be clicked on or otherwise actuated by the user to cause the query builder and visualization user interface 225 to drill down another level in the data. For example, clicking on the "IN" representing the country of India in the table may cause the query builder and visualization user interface 225 user interface to automatically add the country "India" as a filter to the query parameters that were used to obtain the data to populate the table. The query builder and visualization user interface 225 may then resubmit the query parameters including the filter and the auto-cluster operator to the query processing unit 230 for execution. The query processing unit 230 may then cause the cube data model 235 to execute the query on the performance information of the performance information datastore 125 to obtain updated query results. The updated query results may then be provided to the query builder and visualization user interface 225 and the visualization or visualizations provided by the user interface 405 may be updated based on the updated query results.

FIG. 4C shows an example of what the results of how the results of such a drill-down operation may be presented as a visualization on the query builder and visualization user interface 225. FIG. 4C shows an example of the user interface 405 in which the user has drilled down further into the example data shown in FIG. 4B. The user drilled down into the India data to try to track down a source of poor call quality issue being experienced by user of the communication and collaboration platform 110. The user may be able to further drill down into the data shown in the table of the query builder pane 425 to attempt to diagnose the source of the poor call quality issues being experienced by users in India. Drilling down further into the data may add a filter to the query that further narrows the query results based on the location, such as city or building. While this example uses location to demonstrate how the drill-down may be used, the drill-down is not limited to location, and other types of parameters may be used to drill-down into the data. Drilling down triggers the query to be executed again, including the ML aggregation operator, to determine new query results which would then be used to update the visualization shown in the user interface 405.

While the examples shown in FIGS. 4A-4C include only a single visualization, other implementations may include multiple visualizations that may be customized by the user by dragging fields or aggregation operators to the visualization and/or by setting filters for one or more fields associated with the visualization. Furthermore, the visualization may be dynamically updated such that if the user drills down into the details of one visualization, the other visualizations may also be automatically be updated based on the updated query results obtained from the query processing unit 230.

Figure 8A:
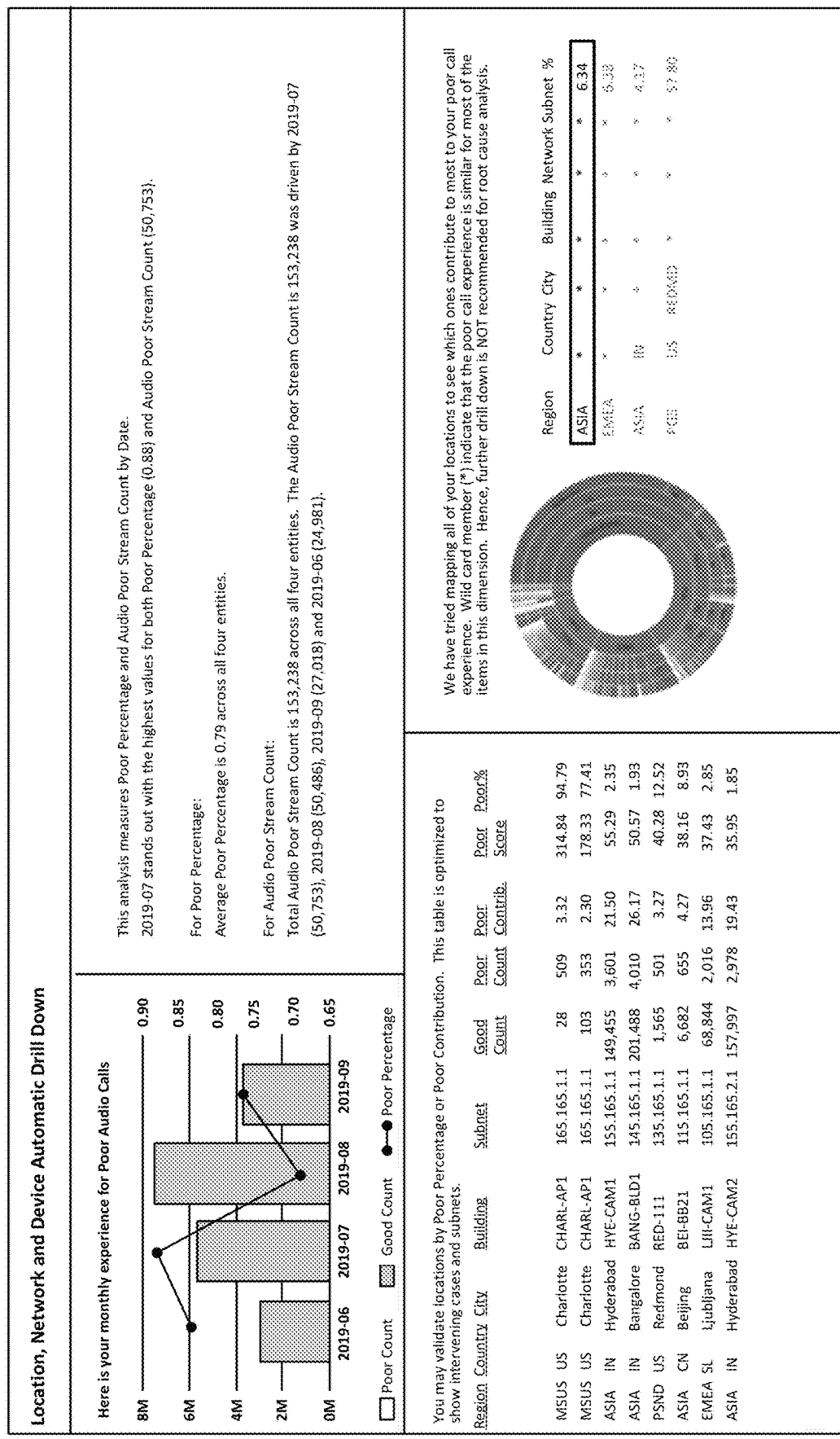
FIGS. 8A and 8B show examples of a user interface that may be used for presenting data visualizations.
Figure 8B:
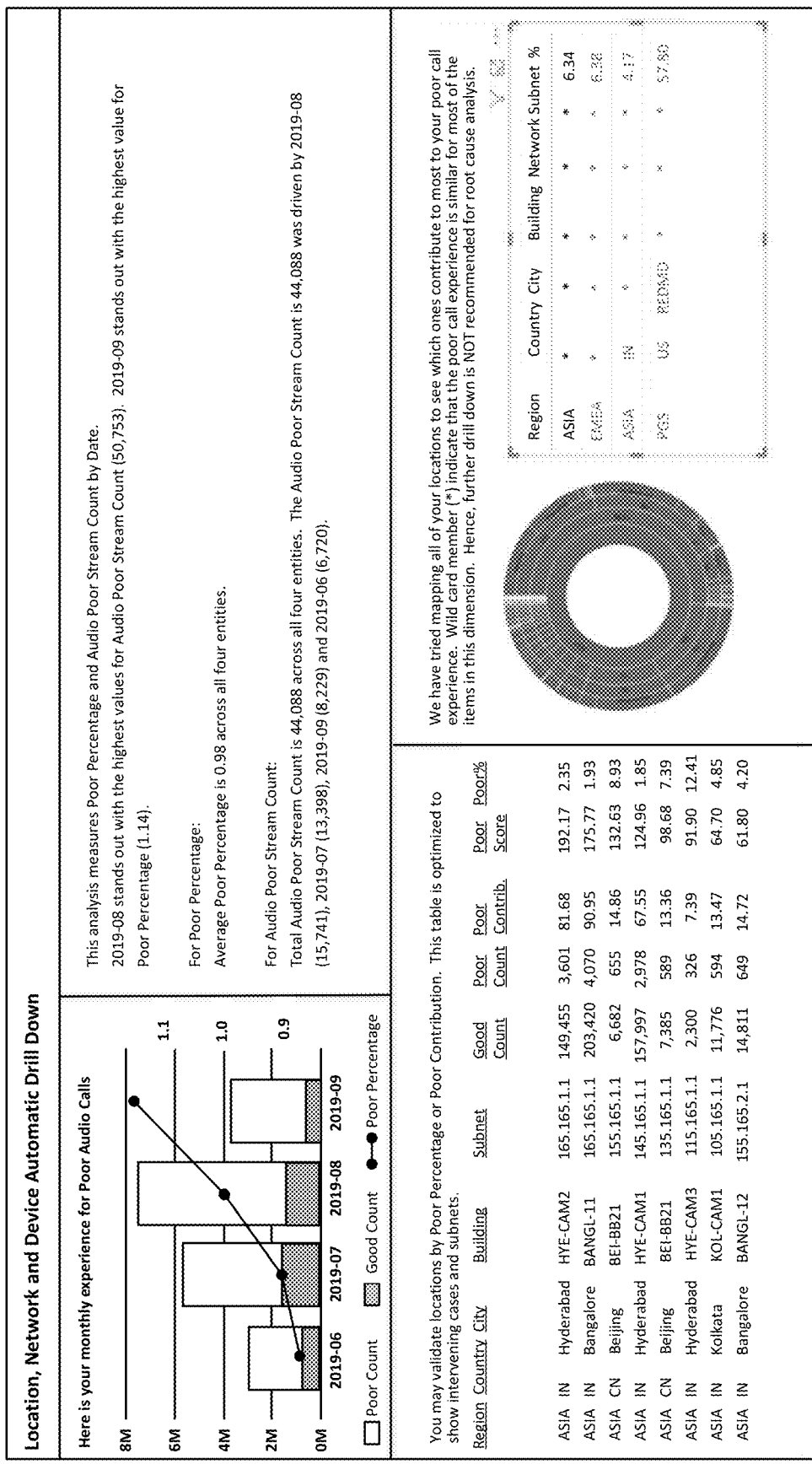

FIGS. 8A and 8B show examples of a user interface 805 that may be used for presenting data visualizations. The examples shown in FIGS. 8A and 8B may be visualization that were created using the user interface 405 shown in FIGS. 4A-4C. The user interface 805 includes multiple visualizations included in panes within the user interface 805. The visualization may be dynamically linked together, and if the data is one is updated the data in the linked visualizations will also be automatically updated.

The visualizations provide the user with the ability to recursively drill down into the data. If the user drills down in the data in one visualization, the other visualizations may be automatically updated. Drilling down into the data causes the user interface 805 to provide updated queries to the query processing unit 230 to refresh the data shown by the visualizations. In the example data shown in FIG. 8A, the data shows that the Asia region experienced poor call quality. The user may, for example, drill into the data for Asia region data by clicking on the first entry in the table in visualization shown in the lower right pane of the user interface 805. The user interface 805 may update the query parameters to include the region Asia to the query parameters and the country may be set to the wildcard value meaning that any country may be selected.

FIG. 8B shows the updated visualizations in response to the user drilling down into the data. The data in each of the visualizations has been narrowed down to reflect the selection of the Asia region in the lower left visualization. The user may recursively drill down into the performance data for the communication and collaboration platform 110 by interacting with the visualization to further narrow down the source of the poor call quality. Each of the visualizations shown by the user interface 805 may again be dynamically updated in response to the use further drilling down into the data. The user may drill down into other the data by selecting other parameters, such as but not limited to the city or the building, to further refine the query results shown in the visualizations.

The visualizations shown in the examples shown in FIGS. 4A-4C, 8A, and 8B show how the techniques provided herein may be used to efficiently identify the root cause of performance problems experience by the communication and collaboration platform 110. These techniques are not limited to the specific visualizations shown or the combination of visualizations shown.

Figure 5:
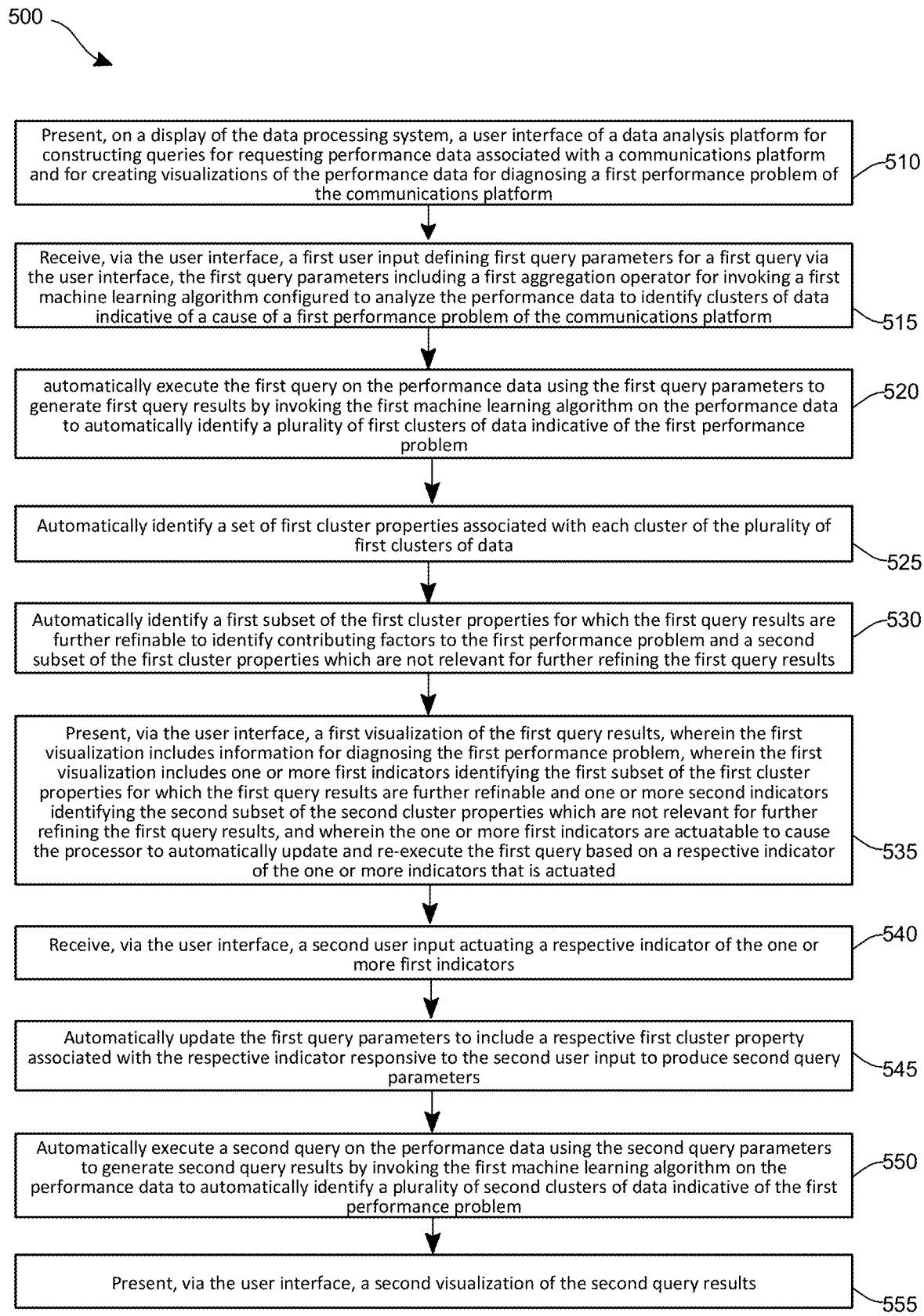
FIG. 5 is a flow chart of an example process for diagnosing performance problems in a communications platform.

FIG. 5 is a flow diagram of an example process 500 for diagnosing performance problems in a communications platform according to the preceding examples. The process 500 may be implemented by the CQD 195 discussed in the preceding examples.

The process 500 may include an operation 510 of presenting, on a display of the data processing system, a user interface of a data analysis platform for constructing queries for requesting performance data associated with a communications platform and for creating visualizations of the performance data for diagnosing a first performance problem of the communications platform. The CQD 195 may present a query builder and visualization user interface 225, such as that described in the preceding examples, for building queries to query the performance information datastore 125. As discussed in the preceding examples, the performance information datastore 125 may include telemetry data collected from various components of the network 120 supporting the communication and collaboration platform 110. The telemetry data may be analyzed to identify problems in elements of the network 120 that are causing performance problems that are impacting the user experience of the users of the communication and collaboration platform 110. The CQD 195 may display the query builder and visualization user interface 225 on a client device 105 associated with an administrator of the communication and collaboration platform 110. The administrator may use the CQD 195 to analyze performance data for the communication and collaboration platform 110 to diagnose performance problems that are impacting the user experience of users of the communication and collaboration platform 110. The performance problems may include, but are not limited to, dropped calls, poor call quality, and poor audio and/or video quality for video calls. The client device 105 may display the user interface in a native application or a web browser installed on the client device 105. The native application may request information from the communication and collaboration platform 110 that may be used to populate the user interface displayed by the native application. The web browser may access a web application provided by the CQD 195 renders a web page, a single page application (SPA), or another user interface that may be rendered and displayed by the web browser on the client device 105.

The process 500 may include an operation 515 of receiving, via the user interface, a first user input defining first query parameters for a first query via the user interface. The first query parameters may include a first aggregation operator for invoking a first machine learning algorithm configured to analyze the performance data to identify clusters of data indicative of a cause of a first performance problem of the communications platform. The query builder and visualization user interface 225 may be configured to provide a user interface in which the user may drag and drop query parameters into a query builder interface. The query builder interface may include aggregation operators that allow the user to obtain aggregate information, such as but not limited to sum, count, average, minimum, and maximum. The query builder interface may also include ML aggregation operators that operate to identify clusters of data that may be indicative of network problems impacting the performance of the communications platform and capture that data for presentation in the query builder and visualization user interface 225. A technical benefit of the query builder and visualization user interface 225 is that the user interface treats the ML aggregation operators the same as any other aggregation operator. The user may drag and drop a ML aggregation operator into the query and CQD 195 to add the machine learning driven machine learning operator to the query.

The process 500 may include an operation 520 of automatically executing the first query on the performance data using the first query parameters to generate first query results by invoking the first machine learning algorithm on the performance data to automatically identify a plurality of first clusters of data indicative of the first performance problem. As discussed in the preceding examples, the query processing unit 230 of the CQD 195 is configured to build a first query to be executed on the performance information datastore 125. The query processing unit 230 may be configured to determine whether the query includes a ML aggregation operator. If the query does not include such an operator, the query processing unit 230 may be build a query that is configured to build a SQL query that may be configured to query the cube data model 235 which is used represent the performance data from the performance information datastore 125 as a data cube. The performance information datastore 125 includes data that may be stored in one or more data stores which are not designed for analysis and the cube data model 235 may serve as a semantic layer that may be placed over the performance information datastore 125 to provide online an analytical processing (OLAP) model directed to analytics and business intelligence. As discussed in the preceding examples, the cube data model 235 may be configured to execute standard, non-ML queries and invoke ML algorithms associated with ML aggregation operators. The results of the standard queries and the ML-based operations may be combined into a single set of query results.

The process 500 may include an operation 525 of automatically identifying a set of first cluster properties associated with each cluster of the plurality of first clusters of data. The machine learning driven operators may be configured to identify clusters of data that may be relevant for determining the source of performance problems being experienced by the communication and collaboration platform 110. As discussed in the preceding examples, one such ML aggregation operator utilizes the automatic clustering or "autocluster" algorithm, which is configured to identify clusters of data in which values of the various dimensions of the data within the performance data are overrepresented. The autocluster algorithm may group these clusters by location to determine which locations are statistically overrepresented in the data. This information may be used to help the administrator narrow down the source of poor call quality, poor video quality, or other performance issues based on a location at which these performance issues are occurring. Another such ML aggregation operator utilizes the automatic differentiation or "diffpatterns" algorithm, which is configured to identify differences between two sets of data. The diffpatterns algorithm may be used to identify differences between data associated with two different days: a first day in which the communication and collaboration platform 110 performs as expected and a second day in which the communication and collaboration platform 110 experiences performance problems. The diffpatterns determine the values that most contribute to the differences between the two days.

The process 500 may include an operation 530 of automatically identifying a first subset of the first cluster properties for which the first query results are further refinable to identify contributing factors to the first performance problem and a second subset of the first cluster properties which are not relevant for further refining the first query results. The query processing unit 230 may obtain the query results from the cube data model 235 and identify one or more clusters for which the data may be further refined. For example, the data may be clustered at a country level and the data may be further refined down to the city, street, or building level. The query processing unit 230 may determine that the data may be further refined for a particular cluster property based on whether that parameter may be further refined as discussed in the preceding examples.

The process 500 may include an operation 535 of presenting, via the user interface, a first visualization of the first query results. The first visualization includes information that may be used for diagnosing the first performance problem. The first visualization may include one or more first indicators identifying the first subset of the first cluster properties for which the first query results may be further refined and one or more second indicators identifying the second subset of the second cluster properties which are not relevant for further refining the first query results. The one or more first indicators are actuatable to cause the processor to automatically update and re-execute the first query based on a respective indicator of the one or more indicators that is actuated. As discussed in the preceding examples, the query builder and visualization user interface 225 may display a graphical indication that identifies the properties that the user may drill down into further to refine the query results. The query builder and visualization user interface 225 may display a wildcard indicator for those properties which, if selected by the user, would not further refine the results.

The process 500 may include an operation 540 of receiving, via the user interface, a second user input actuating a respective indicator of the one or more first indicators. The user may click on or otherwise actuate one of the indicators that represent one of the properties that may be further refined. The actuation of the indicator may trigger the query builder and visualization user interface 225 to update the query parameters and provide the updated query parameters to the query processing unit 230.

The process 500 may include an operation 545 of automatically updating the first query parameters to include a respective first cluster property associated with the respective indicator responsive to the second user input to produce second query parameters. The parameter selected by the user may be added to the query parameters by the query builder and visualization user interface 225, and the updated query parameters may be provided to the query processing unit 230 for execution.

The process 500 may include an operation 550 of automatically executing a second query on the performance data using the second query parameters to generate second query results by invoking the first machine learning algorithm on the performance data to automatically identify a plurality of second clusters of data indicative of the first performance problem. The query processing unit 230 may generate a query to be executed on the cube data model 235, which may in turn formulate one or more queries to be performed on the performance datastore 125. The cube data model 235 may format the second query results into a format that is expected by the query processing unit 230. The query processing unit 230 may then provide the query results to the query builder and visualization user interface 225, and the query builder and visualization user interface 225 may present the results on a display of the client device 105 of the user that performed the query.

The process 500 may include an operation 555 of presenting, via the user interface, a second visualization of the second query results. The query builder and visualization user interface 225 may be updated to display the second query results in which the user has drilled down into first query results to further refine the search results. The user may further refine the search results by again clicking or otherwise activating an indication associated one of the clustering parameters that indicates that the results may be further refined for that particular parameter. The query builder and visualization user interface 225 may also dynamically update any reports, graphs, tables, and/or other information based on the second query results.

The detailed examples of systems, devices, and techniques described in connection with FIGS. 1-5 and 8A-8B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-5 and 8A-8B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 6:
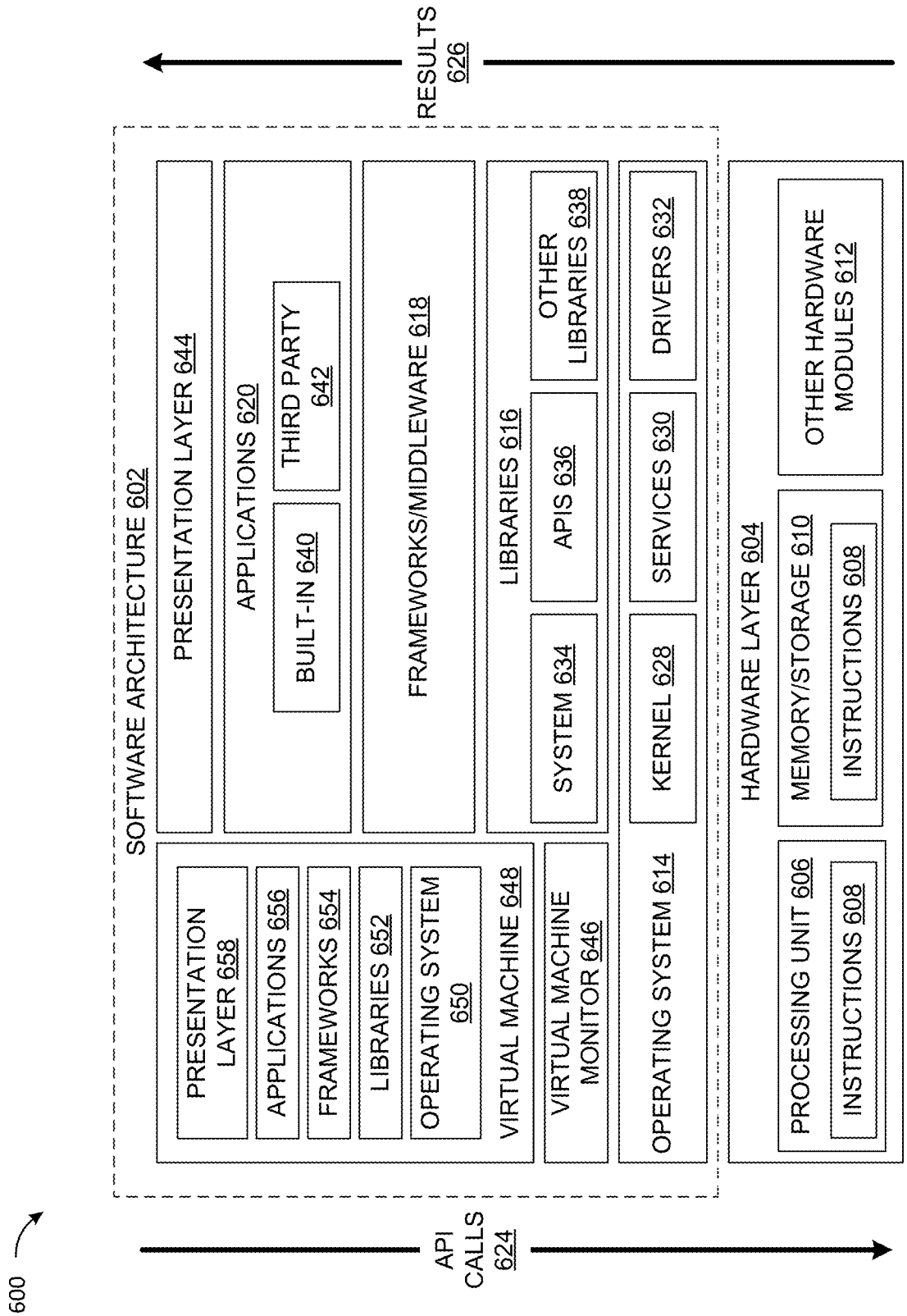
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
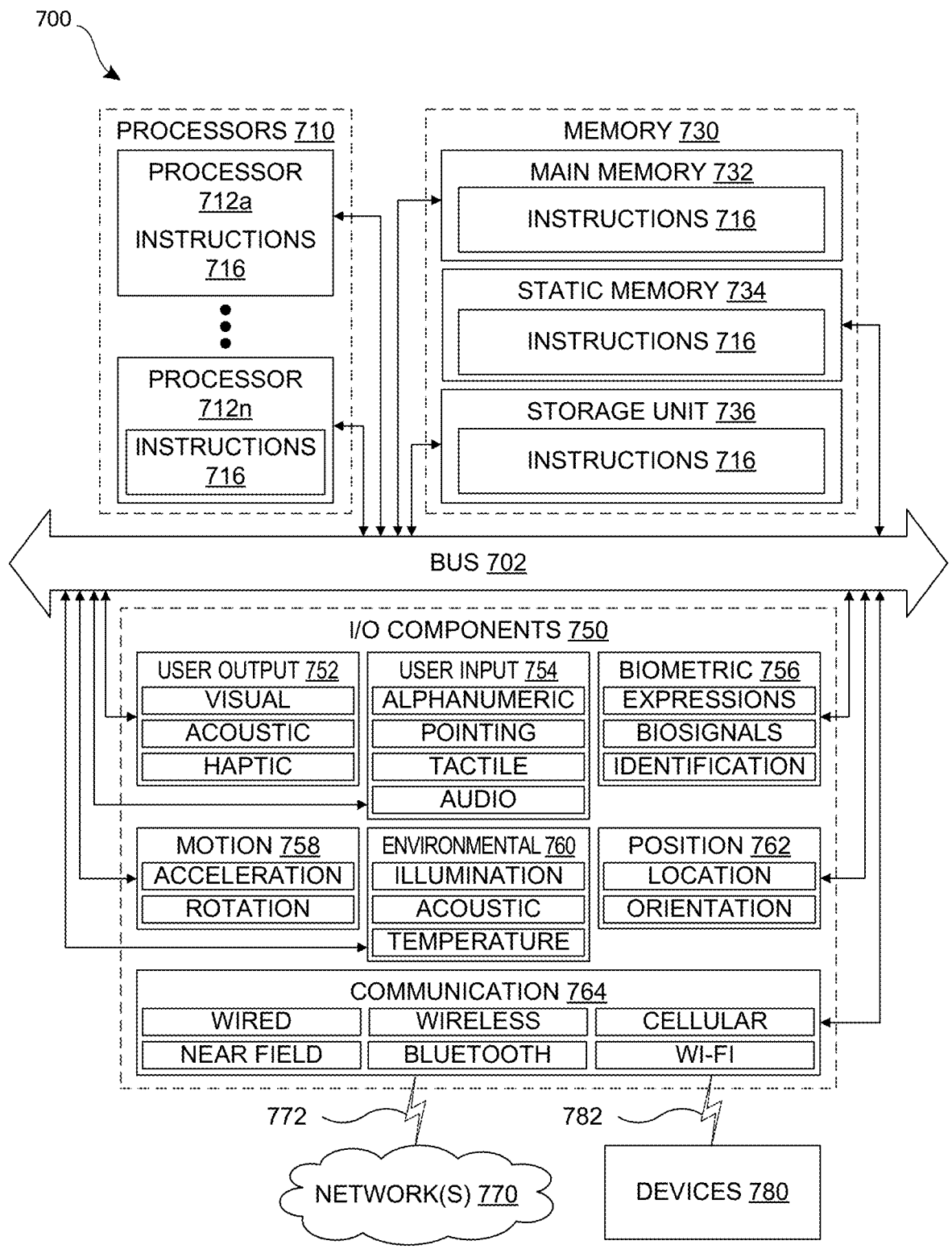
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable medium storing executable instructions for causing the processor to perform operations comprising:
   analyzing performance data associated with a communications platform to generate a multidimensional representation of the performance data;
   presenting, on a display of the data processing system, a user interface of a data analysis platform for constructing queries of the multidimensional representation of the performance data and for creating visualizations of the performance data for diagnosing a first performance problem of the communications platform;
   receiving, via the user interface, a first user input defining first query parameters for a first query via the user interface, the first query parameters including a first aggregation operator for invoking a first machine learning algorithm configured to analyze the performance data in the multidimensional representation of the performance data to identify clusters of data indicative of a cause of a first performance problem of the communications platform, wherein each dimension of the multidimensional representation of the performance data represents a logical group of the performance data according to one or more shared attributes;
   constructing the first query based on the first user input;
   automatically executing the first query on the performance data using the first query parameters to generate first query results by invoking the first machine learning algorithm on the performance data to automatically identify a plurality of first clusters of data indicative of the first performance problem;
   automatically identifying a set of first cluster properties associated with each cluster of the plurality of first clusters of data by performing a comparison on multiple dimensions of the performance data to identify values or combinations of values in the performance data indicative of the cause of the first performance problem;

automatically identifying a first subset of the set of first cluster properties for which the first query results are further refinable into one or more subcategories of properties to identify contributing factors to the first performance problem and a second subset of the set of first cluster properties which cannot be broken down into one or more subcategories of properties to further refine the first query results;

presenting, via the user interface, a first visualization of the first query results, wherein the first visualization includes information for diagnosing the first performance problem, wherein the first visualization includes one or more first indicators identifying the first subset of the set of first cluster properties for which the first query results are further refinable into one or more subcategories of properties and one or more second indicators identifying the second subset of the second subset of the set of first cluster properties which cannot be broken down into one or more subcategories of properties to further refine the first query results, and wherein the one or more first indicators are actuatable to cause the processor to automatically update and re-execute the first query based on a respective indicator of the one or more first indicators that is actuated;

receiving, via the user interface, a second user input actuating a respective indicator of the one or more first indicators;

automatically updating the first query parameters to include a respective first cluster property associated with the respective indicator responsive to the second user input to produce second query parameters;

constructing a second query based on the second query parameters;

automatically executing the second query on the performance data using the second query parameters to generate second query results by invoking the first machine learning algorithm on the performance data to automatically identify a plurality of second clusters of data indicative of the first performance problem; and presenting, via the user interface, a second visualization of the second query results.

2. The data processing system of claim 1, wherein the machine-readable medium includes instructions for causing the processor to perform operations of:

automatically identifying a set of second cluster properties associated with each cluster of the plurality of second clusters of data; and automatically identifying a first subset of the set of second cluster properties for which the second query results may are further refinable into one or more subcategories of properties to identify contributing factors to the first performance problem and a second subset of the set of second cluster properties which cannot be broken down into one or more subcategories of properties to further refine the second query results;

wherein to present the first visualization of the second query results, the machine-readable medium includes instructions for causing the processor to perform operations of:

presenting the second visualization of the second query results, wherein the second visualization includes one or more third indicators identifying the first subset of the set of second cluster properties for which the second query results further refinable into one or more subcategories of properties and one or more fourth indicators identifying the second subset of the set of second cluster properties which cannot be broken down into one or more subcategories of properties to further refine the second query results, and wherein the one or more third indicators are actuatable to cause the processor to automatically update and re-execute the second query based on the respective indicator that is actuated.

3. The data processing system of claim 1, wherein the first query parameters include a location identifier, and wherein to automatically executing the first query on the performance data using the first query parameters to generate first query results, the machine-readable medium includes instructions for causing the processor to perform operations of:

providing the location identifier as an input to the first machine learning algorithm;

invoking the first machine learning algorithm to generate first location-based clustering information by performing a volumetric comparison of values of location-based dimensions of the performance data to identify values or combinations of values which are over-represented in the performance data; and generating the first query results based at least in part on the first location-based clustering information.

4. The data processing system of claim 1, wherein the first query parameters include date information including a first date representing a date on which problems with network connectivity were experienced on the communications platform and a second date representing a date on which problems were not experienced on the communications platform.

5. The data processing system of claim 4, wherein to analyze the performance data using a first machine learning model, the machine-readable medium includes instructions for causing the processor to perform operations of:

providing the date information as an input to the first machine learning algorithm;

invoking the first machine learning algorithm to generate first date-based difference information by normalizing the performance data for the first date and the second date to generate normalized performance data and performing a volumetric comparison of values of the normalized performance data to identify values contributing most to differences in network performance of the first date and the second date; and generating the first query results based at least in part on the first date-based difference information.

6. The data processing system of claim 1, wherein to execute the first query on the performance data to generate the first query results, the machine-readable medium includes instructions for causing the processor to perform operations of:

automatically reformulating the first query from a first query format to a second query format, wherein the first query format is for querying a structured data model associated with the user interface, and wherein the second query format is for querying non-structured data.

7. The data processing system of claim 6, wherein the machine-readable medium includes instructions for causing the processor to perform operations of:

reformatting the first query results from a first query result format associated with the non-structured data to a second query result format associated with the structured data model; and generating the first visualization of the first query results using the second query result format.

8. A method implemented in a data processing system for diagnosing problems in a communications platform, the method comprising:

analyzing performance data associated with a communications platform to generate a multidimensional representation of the performance data;

presenting, on a display of the data processing system, a user interface of a data analysis platform for constructing queries of the multidimensional representation of the performance data and for creating visualizations of the performance data for diagnosing a first performance problem of the communications platform;

receiving, via the user interface, a first user input defining first query parameters for a first query via the user interface, the first query parameters including a first aggregation operator for invoking a first machine learning algorithm configured to analyze the performance data in the multidimensional representation of the performance data to identify clusters of data indicative of a cause of a first performance problem of the communications platform, wherein each dimension of the multidimensional representation of the performance data represents a logical group of the performance data according to one or more shared attributes;

constructing the first query based on the first user input;

automatically executing the first query on the performance data using the first query parameters to generate first query results by invoking the first machine learning algorithm on the performance data to automatically identify a plurality of first clusters of data indicative of the first performance problem;

automatically identifying a set of first cluster properties associated with each cluster of the plurality of first clusters of data by performing a comparison on multiple dimensions of the performance data to identify values or combinations of values in the performance data indicative of the cause of the first performance problem;

automatically identifying a first subset of the set of first cluster properties for which the first query results are further refinable into one or more subcategories of properties to identify contributing factors to the first performance problem and a second subset of the set of first cluster properties which cannot be broken down into one or more subcategories of properties to further refine the first query results;

presenting, via the user interface, a first visualization of the first query results, wherein the first visualization includes information for diagnosing the first performance problem, wherein the first visualization includes one or more first indicators identifying the first subset of the set of first cluster properties for which the first query results are further refinable into one or more subcategories of properties and one or more second indicators identifying the second subset of the second subset of the set of first cluster properties which cannot be broken down into one or more subcategories of properties to further refine the first query results, and wherein the one or more first indicators are actuatable to cause a processor of the data processing system to automatically update and re-execute the first query based on a respective indicator of the one or more first indicators that is actuated;

receiving, via the user interface, a second user input actuating a respective indicator of the one or more first indicators;

automatically updating the first query parameters to include a respective first cluster property associated with the respective indicator responsive to the second user input to produce second query parameters;

constructing a second query based on the second query parameters;

automatically executing the second query on the performance data using the second query parameters to generate second query results by invoking the first machine learning algorithm on the performance data to automatically identify a plurality of second clusters of data indicative of the first performance problem; and presenting, via the user interface, a second visualization of the second query results.

9. The method of claim 8, further comprising:

automatically identifying a set of second cluster properties associated with each cluster of the plurality of second clusters of data; and automatically identifying a first subset of the set of second cluster properties for which the second query results are further refinable into one or more subcategories of properties to identify contributing factors to the first performance problem and a second subset of the set of second cluster properties which cannot be broken down into one or more subcategories of properties to further refine the second query results;

wherein presenting the second visualization of the second query results further comprises:

presenting the second visualization of the second query results, wherein the second visualization includes one or more third indicators identifying the first subset of the set of second cluster properties for which the second query results are further refinable into one or more subcategories of properties and one or more fourth indicators identifying the second subset of the set of second cluster properties which cannot be broken down into one or more subcategories of properties to further refine the second query results, and wherein the one or more third indicators are actuatable to cause the processor to automatically update and re-execute the second query based on the respective indicator that is actuated.

10. The method of claim 8, wherein the first query parameters include a location identifier, and automatically executing the first query on the performance data using the first query parameters to generate first query results, the method further comprising:

providing the location identifier as an input to the first machine learning algorithm;

invoking the first machine learning algorithm to generate first location-based clustering information by performing a volumetric comparison of values of location-based dimensions of the performance data to identify values or combinations of values which are over-represented in the performance data; and generating the first query results based at least in part on the first location-based clustering information.

11. The method of claim 8, wherein the first query parameters include date information including a first date representing a date on which problems with network connectivity were experienced on the communications platform and a second date representing a date on which problems were not experienced on the communications platform.

12. The method of claim 11, wherein analyzing the performance data using a first machine learning model further comprises:
   providing the date information as an input to the first machine learning algorithm;
   invoking the first machine learning algorithm to generate first date-based difference information by normalizing the performance data for the first date and the second date to generate normalized performance data and performing a volumetric comparison of values of the normalized performance data to identify values contributing most to differences in network performance of the first date and the second date; and
   generating the first query results based at least in part on the first date-based difference information.

13. The method of claim 8, executing the first query on the performance data to generate the first query results further comprises:
   automatically reformulating the first query from a first query format to a second query format, wherein the first query format is for querying a structured data model associated with the user interface, and wherein the second query format is for querying non-structured data;
   reformatting the first query results from a first query result format associated with the non-structured data to a second query result format associated with the structured data model; and
   generating the first visualization of the first query results using the second query result format.

14. The method of claim 13, further comprising:
   reformatting the first query results from a first query result format associated with the non-structured data to a second query result format associated with the structured data model; and
   generating the first visualization of the first query results using the second query result format.

15. A machine-readable medium on which are stored instructions that, when executed, cause a processor of a programmable device to perform functions of:
   analyzing performance data associated with a communications platform to generate a multidimensional representation of the performance data;
   presenting, on a display of the programmable device, a user interface of a data analysis platform for constructing queries of the multidimensional representation of the performance data and for creating visualizations of the performance data for diagnosing a first performance problem of the communications platform;
   receiving, via the user interface, a first user input defining first query parameters for a first query via the user interface, the first query parameters including a first aggregation operator for invoking a first machine learning algorithm configured to analyze the performance data in the multidimensional representation of the performance data to identify clusters of data indicative of a cause of a first performance problem of the communications platform, wherein each dimension of the multidimensional representation of the performance data represents a logical group of the performance data according to one or more shared attributes;
   constructing the first query based on the first user input;
   automatically executing the first query on the performance data using the first query parameters to generate first query results by invoking the first machine learning algorithm on the performance data to automatically identify a plurality of first clusters of data indicative of the first performance problem;
   automatically identifying a set of first cluster properties associated with each cluster of the plurality of first clusters of data by performing a comparison on multiple dimensions of the performance data to identify values or combinations of values in the performance data indicative of the cause of the first performance problem;
   automatically identifying a first subset of the set of first cluster properties for which the first query results are further refinable into one or more subcategories of properties to identify contributing factors to the first performance problem and a second subset of the set of first cluster properties which cannot be broken down into one or more subcategories of properties to further refine the first query results;
   presenting, via the user interface, a first visualization of the first query results, wherein the first visualization includes information for diagnosing the first performance problem, wherein the first visualization includes one or more first indicators identifying the first subset of the set of first cluster properties for which the first query results are further refinable into one or more subcategories of properties and one or more second indicators identifying the second subset of the second subset of the set of first cluster properties which cannot be broken down into one or more subcategories of properties to further refine the first query results, and wherein the one or more first indicators are actuatable to cause the processor to automatically update and re-execute the first query based on a respective indicator of the one or more first indicators that is actuated;
   receiving, via the user interface, a second user input actuating a respective indicator of the one or more first indicators;
   automatically updating the first query parameters to include a respective first cluster property associated with the respective indicator responsive to the second user input to produce second query parameters;
   constructing a second query based on the second query parameters;
   automatically executing the second query on the performance data using the second query parameters to generate second query results by invoking the first machine learning algorithm on the performance data to automatically identify a plurality of second clusters of data indicative of the first performance problem; and
   presenting, via the user interface, a second visualization of the second query results.

16. The machine-readable medium of claim 15, wherein the machine-readable medium includes instructions for causing the processor to perform operations of:
   automatically identifying a set of second cluster properties associated with each cluster of the plurality of second clusters of data; and
   automatically identifying a first subset of the set of second cluster properties for which the second query results are further refinable into one or more subcategories of properties to identify contributing factors to the first performance problem and a second subset of the set of second cluster properties which cannot be broken down into one or more subcategories of properties to further refine the second query results;

wherein to present the first visualization of the second query results, the machine-readable medium includes instructions for causing the processor to perform operations of:
  presenting the second visualization of the second query results, wherein the second visualization includes one or more third indicators identifying the first subset of the set of second cluster properties for which the second query results are further refinable into one or more subcategories of properties and one or more fourth indicators identifying the second subset of the set of second cluster properties which cannot be broken down into one or more subcategories of properties to further refine the second query results, and wherein the one or more third indicators are actuatable to cause the processor to automatically update and re-execute the second query based on the respective indicator that is actuated.

17. The machine-readable medium of claim 15, wherein the first query parameters include a location identifier, and wherein to automatically executing the first query on the performance data using the first query parameters to generate first query results, the machine-readable medium includes instructions for causing the processor to perform operations of:
  providing the location identifier as an input to the first machine learning algorithm;
  invoking the first machine learning algorithm to generate first location-based clustering information by performing a volumetric comparison of values of location-based dimensions of the performance data to identify values or combinations of values which are over-represented in the performance data; and
  generating the first query results based at least in part on the first location-based clustering information.

18. The machine-readable medium of claim 15, wherein the first query parameters include date information including a first date representing a date on which problems with network connectivity were experienced on the communications platform and a second date representing a date on which problems were not experienced on the communications platform.

19. The machine-readable medium of claim 18, wherein to analyze the performance data using a first machine learning model, the machine-readable medium includes instructions for causing the processor to perform operations of:
  providing the date information as an input to the first machine learning algorithm;
  invoking the first machine learning algorithm to generate first date-based difference information by normalizing the performance data for the first date to create normalized performance data and the second date and performing a volumetric comparison of values of the normalized performance data to identify values contributing most to differences in network performance of the first date and the second date; and
  generating the first query results based at least in part on the first date-based difference information.

20. The machine-readable medium of claim 15, wherein to execute the first query on the performance data to generate the first query results, the machine-readable medium includes instructions for causing the processor to perform operations of:
  automatically reformulating the first query from a first query format to a second query format, wherein the first query format is for querying a structured data model associated with the user interface, and wherein the second query format is for querying non-structured data;
  reformatting the first query results from a first query result format associated with the non-structured data to a second query result format associated with the structured data model; and
  generating the first visualization of the first query results using the second query result format.

* * * * *